United States Patent [19]
Montes

[11] 4,251,083
[45] Feb. 17, 1981

[54] PISTON RING WITH TONGUE AND GROOVE JOINT

[76] Inventor: Adriel Montes, 18415 Weaver, Detroit, Mich. 48228

[21] Appl. No.: 39,306

[22] Filed: May 15, 1979

[51] Int. Cl.³ .............................................. F16J 9/14
[52] U.S. Cl. ................................................. 277/221
[58] Field of Search ........................ 277/220, 221, 222

[56] References Cited
U.S. PATENT DOCUMENTS

| | | | |
|---|---|---|---|
| 1,398,439 | 11/1921 | McMaster | 277/221 |
| 2,080,935 | 5/1937 | Slyk | 277/222 |
| 2,485,862 | 10/1949 | Caza | 277/221 |

FOREIGN PATENT DOCUMENTS 492080  9/1938  United Kingdom .................... 277/221

Primary Examiner—Robert I. Smith
Attorney, Agent, or Firm—Charles W. Chandler

[57] ABSTRACT

A piston ring having its ends shaped to form a tongue and groove joint.

14 Claims, 16 Drawing Figures

U.S. Patent  Feb. 17, 1981  Sheet 1 of 2  4,251,083

# PISTON RING WITH TONGUE AND GROOVE JOINT

BACKGROUND OF THE INVENTION

This invention is related to piston rings, and more particularly to a one-piece piston ring having one end slidably received between a pair of opposed walls in the other end to minimize the blow-by of fluids or gases.

Piston rings are employed in a variety of engines and machines, such as internal combustion engines, steam engines, compressors, pumps, and the like, usually where a piston is movable according to pressure variations at the head of the piston. A conventional piston ring comprises an elongated spring-like element having spaced ends. When the ring is mounted on the piston in a cylinder liner, the ends are moved toward one another to form a joint. One problem with a conventional piston ring is that as the ring and the piston are heated up, the joint ends tend to separate during a portion of the stroke thereby permitting blow-by of the gases or fluid. This pressure loss reduces the efficiency of the device in which the piston is mounted.

Another problem with conventional piston rings is that relative motion between piston ends, as the piston is being reciprocated, causes the cylinder walls to wear and thereby reduce the life of the cylinder liner.

SUMMARY OF THE INVENTION

The broad purpose of the present invention is to provide a one-piece piston ring having its ends mating in a tongue and groove mating joint, the groove having a pair of generally opposed walls formed such that the tongue is slidably engaged with at least one of the walls depending upon the direction of motion of the piston.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENTS

Figure 1:
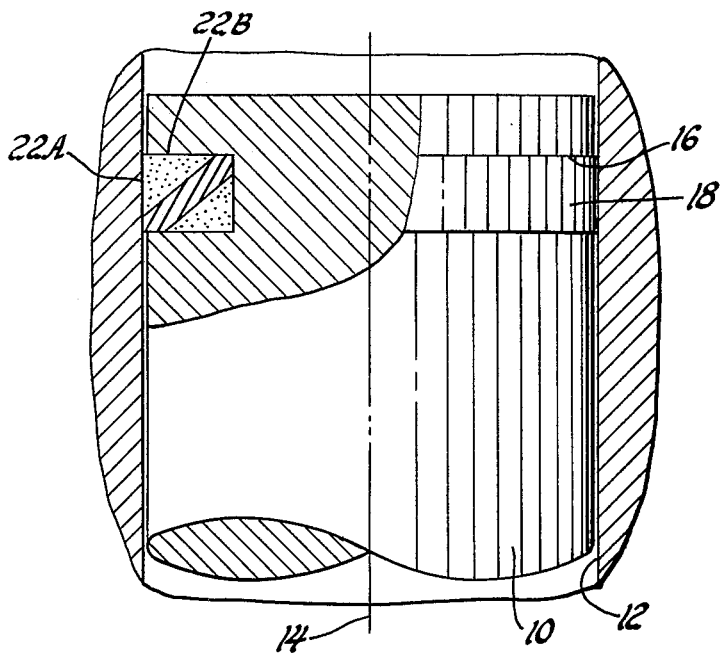
FIG. 1 is a fragmentary sectional view of a piston mounted in a cylinder showing the manner in which a preferred ring is mounted.

Referring to the drawings, FIG. 1 is a fragmentary view of a piston 10 reciprocally mounted in a cylinder 12. Piston 10 has a conventional cylindrical wall formed about an axis 14 which coincides with the longitudinal axis of the cylinder wall.

Piston 10 has a circumferential slot 16. A ring 18 is mounted in slot 16 so as to be carried with the piston, slidably engaged with the wall of cylinder 12.

Figure 2:
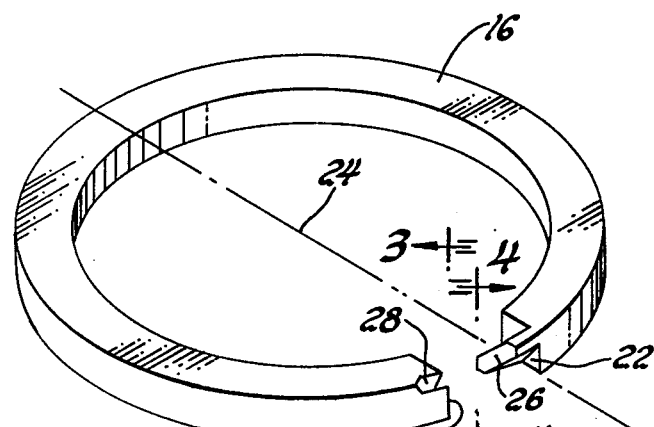
FIG. 2 is a perspective view of the preferred ring.

Referring to FIG. 2, ring 18 is formed of metal, preferably of cast iron, however, it can be formed of a variety of suitable materials. The ring is resilient and split to form spaced ends 20 and 22. Ring 16 has a cylinder contact surface 22A and a side surface 22B generally parallel to the piston top. The spaced ends of the ring permit the user to assemble the ring in piston slot 16.

Ring 18 is formed about an axis of curvature 24 which coincides with cylinder axis 14 when the piston and ring are mounted in the cylinder.

Figure 3:
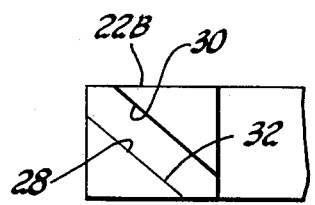
FIG. 3 is a view as seen along lines 3—3 of FIG. 2.
Figure 4:
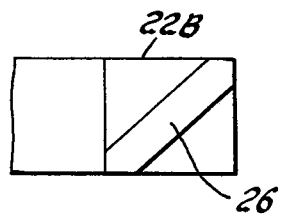
FIG. 4 is a view as seen along lines 4—4 of FIG. 2.

Referring to FIGS. 3 and 4, end 26 of the ring has a tongue 26, and end 20 has a groove 28. Groove 28 has a pair of spaced, parallel, opposed walls 30 and 32 formed at an angle of approximately 45° with respect to side surface 22B. Tongue 26 is also formed at a similar angle so as to be slidably receivable between walls 30 and 32.

Normally, the variable pressure at the head of piston 10, coupled with the piston motion within the cylinder tends to cause relative motion between the ring ends. The opposed walls of groove 28 are such that if the piston is being moved in one direction, tongue 26 will be slidably engaged with wall 30, and if the piston is being moved in the opposite direction, the tongue will be slidably engaged with the opposite wall thereby providing a joint minimizing blow-by.

Figure 5:
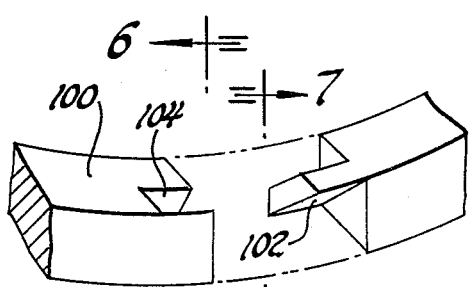
FIG. 5 is a fragmentary perspective view of the ends of another embodiment of the invention.
Figure 6:
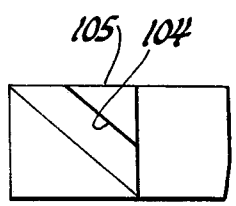
FIG. 6 is a view as seen along lines 6—6 of FIG. 5.
Figure 7:
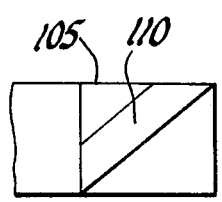
FIG. 7 is a view as seen along lines 7—7 of FIG. 5.

FIGS. 5-7 show another embodiment of the invention comprising a ring 100, having an axis of curvature and a diameter identical to that of ring 16, but with the ends formed in a different configuration. One end of ring 100 has a tongue 102, and the opposite end has a groove 104. In this case, one wall of groove 104 extends between opposite corners of the ring cross-section whereas in the embodiment of FIGS. 1-4, the groove walls are on opposite sides of the corners. Tongue 110 is slidably receivable within groove 104 with both the tongue and groove being disposed at an angle of 45° with respect to ring side surface 105.

Figure 8:
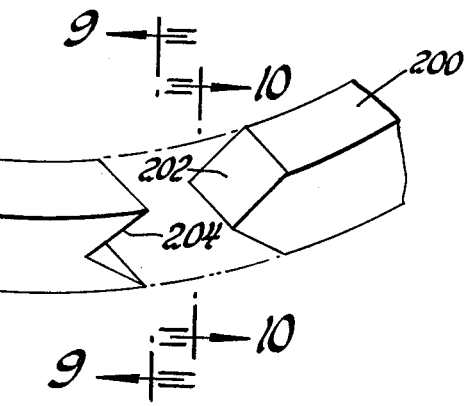
FIG. 8 is a perspective view of still another embodiment of the invention.
Figure 9:
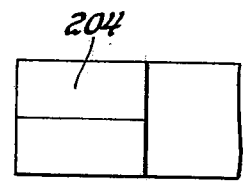
FIG. 9 is a view as taken along lines 9—9 of FIG. 8.
Figure 10:
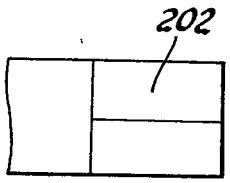
FIG. 10 is a view as seen along lines 10—10 of FIG. 8.

FIG. 8 shows another embodiment comprising ring 200 having an axis of curvature and a diameter identical to that of ring 16. In this embodiment of the invention, tongue 202 has a V-shaped cross-section receivable within opposed walls of groove 204 which converge toward one another.

Figure 11:
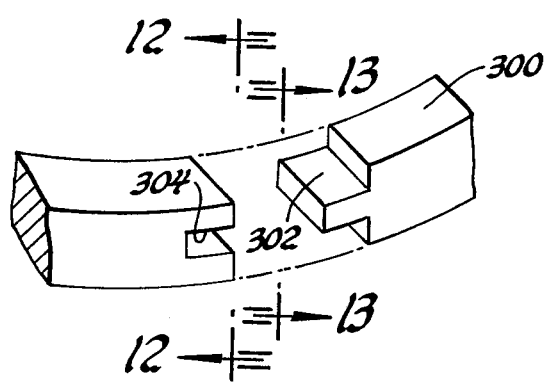
FIG. 11 is a view of still another embodiment of the invention.
Figure 12:
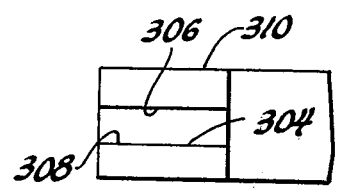
FIG. 12 is a view as seen along lines 12—12 of FIG. 11.

FIG. 11 shows another embodiment of the invention comprising ring 300 which also has an axis of curvature and a diameter identical to that of ring 16. The ends of ring 300 are formed with a tongue 302 and a groove 304. Groove 304 has a pair of spaced, opposed walls 306 and 308 which are parallel to one another for receiving tongue 302 such that the tongue is slidably engaged with walls 306 and 308. In this embodiment of the invention, walls 306 and 308 are parallel to ring side surface 310.

Figure 14:
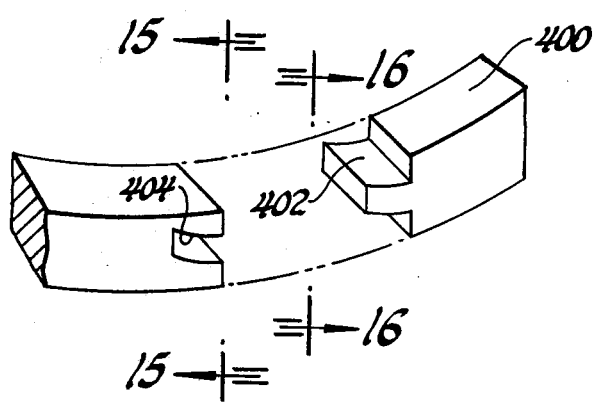
FIG. 14 is a perspective view of still another embodiment of the invention.
Figure 13:
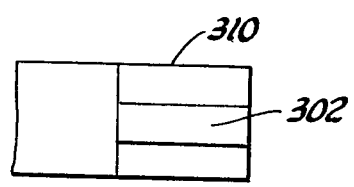
FIG. 13 is a view as seen along lines 13—13 of FIG. 11.
Figure 15:
FIG. 15 is a view as seen along lines 15—15 of FIG. 14.
Figure 16:
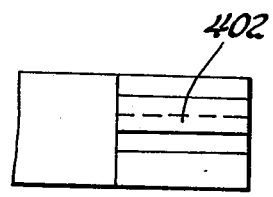
FIG. 16 is a view as seen along lines 16—16 of FIG. 14.

FIG. 14 illustrates piston 400 having an axis of curvature and a diameter identical to that of ring 16. One end of ring 400 has a tongue 402 and its opposite end having a groove 404. In this embodiment of the invention, the groove sidewalls are curvilinear, and the tongue has a shape complementary to the groove so that it is slidably receivable between the groove walls when the ring is mounted in the cylinder.

Having described my invention, I claim:

1. A piston ring comprising an elongated one-piece element having a cylinder contact surface, a side surface extending the length of said element and a pair of relatively movable ends including a first end and a second end, said first end having a groove including a pair of generally opposed walls, said walls being planar and parallel with respect one to the other and being disposed at an angle of about 45° with respect to said ring side surface, the second end being receivable in said groove to prevent relative motion between the ends of the ring in directions normal to said side surface.

2. A piston ring comprising an elongated one-piece element having a cylinder contact surface, a side surface extending the length of said element, and a pair of relatively movable ends including a first end and a second end, said first end having a groove including a pair of generally opposed walls, said walls being planar and parallel with respect one to the other and being disposed at an angle less than 90° with respect to said ring side surface, the second end being receivable in said groove to prevent relative motion between the ends of the ring in directions normal to said side surface, said element having a generally rectangular cross-section and one of said groove parallel walls extending diagonally from one of the corners of said cross-section to the opposite corner thereof.

3. A piston ring comprising an elongated one-piece element having a cylinder contact surface, and a side surface extending the length of said element, and a pair of relatively movable ends, including a first end and a second end, said first end having a groove including a pair of generally opposed walls, said walls being planar and parallel with respect one to the other and being disposed at an angle less than 90° with respect to said ring side surface, the second end being receivable in said groove to prevent relative motion between the ends of the ring in directions normal to said side surface, said element having a generally rectangular cross-section and the parallel walls of said groove being spaced on opposite sides of a pair of nonadjacent corners of said cross-section.

4. A piston ring as defined in claims 1, 2, or 3, in which the second end of the ring is slidably receivable within the parallel walls of said groove.

5. A piston ring as defined in claims 1, 2, or 3, in which the second end of the ring has a reduced thickness defining a pair of planar parallel walls on opposite sides of said reduced end such that the second end is slidably receivable within the parallel walls of said first end.

6. A piston ring as defined in claims 1, 2, or 3, in which the piston ring is receivable within the slot of a piston, said slot having opposed sidewalls, the side surface of said ring being engageable with one of the sidewalls of said piston slot and the second end of the ring has a reduced thickness forming a pair of planar parallel surfaces slidably receivable between the opposed sidewalls of the first end.

7. A piston ring comprising an elongated one-piece element having a cylinder contact surface, a side surface extending the length of said element, and a pair of relatively movable ends, including a first end and a second end, said first end having a groove including a pair of generally opposed walls, said groove having ends opening in opposite sides of said element, the second end being receivable in said groove to prevent relative motion between the ends of the rings in directions normal to said side surface and being movable through each of the ends of said groove in a direction of about 45° with respect to said ring side surface.

8. A piston ring comprising an elongated one-piece element having a cylinder contact surface, a side surface extending the length of said element adjacent said cylinder contact surface, a pair of relatively movable ends including a first end and a second end, said first end having a groove, the second end having a tongue defined by a pair of planar parallel sides disposed at an angle less than 90° but greater than 0° with respect to said ring side surface, said tongue being receivable in said groove to prevent relative motion between the ends of the ring in directions normal to said side surface.

9. A piston ring as defined in claim 8, in which the parallel sides of said tongue are disposed at an angle of about 45° with respect to said ring side surface.

10. A piston ring as defined in claim 8, in which said element has a generally rectangular cross-section and one of the parallel sides of said tongue extends diagonally from one of the corners of said cross-section to the opposite corner thereof.

11. A piston ring as defined in claim 8, in which the ring has a generally rectangular cross-section and the parallel sides of said tongue are spaced on opposite sides of a pair of nonadjacent corners of said cross-section.

12. A piston ring as defined in claim 8, in which said tongue is slidably received within said groove.

13. A piston ring as defined in claim 8, in which said groove has a pair of opposed spaced parallel sidewalls slidably receiving said tongue.

14. A piston ring comprising an elongated one-piece element having a cylinder contact surface, a side surface extending the length of said element, and a pair of relatively movable ends including a first end and a second end, said first end having a groove including a pair of generally opposed walls, said walls being planar and parallel with respect to one another, but nonparallel with respect to said ring side surface, said groove having ends opening in opposite sides of said element, the second end having a tongue receivable in said groove to prevent relative motion between the ends of the ring in directions normal to said side surface, said tongue being movable through both ends of said groove in directions forming an angle greater than 0° but less than 90° with respect to said ring side surface.

* * * * *